(12) United States Patent
Cui et al.

(10) Patent No.: US 11,099,998 B2
(45) Date of Patent: Aug. 24, 2021

(54) METHOD AND DEVICE FOR OPTIMIZATION OF DATA CACHING

(71) Applicant: EMC IP Holding Company LLC, Hopkinton, MA (US)

(72) Inventors: Wei Cui, Shanghai (CN); Denny Dengyu Wang, Shanghai (CN); Jian Gao, Beijing (CN); Lester Zhang, Beijing (CN); Chen Gong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 52 days.

(21) Appl. No.: 16/785,885

(22) Filed: Feb. 10, 2020

(65) Prior Publication Data

US 2020/0183846 A1 Jun. 11, 2020

Related U.S. Application Data

(63) Continuation of application No. 15/953,770, filed on Apr. 16, 2018, now Pat. No. 10,599,572.

(30) Foreign Application Priority Data

Apr. 17, 2017 (CN) .......................... 201710250599.8

(51) Int. Cl.
*G06F 12/0864* (2016.01)
*G06F 3/06* (2006.01)
*G06F 12/0817* (2016.01)
*G06F 12/0895* (2016.01)

(52) U.S. Cl.
CPC ........ *G06F 12/0864* (2013.01); *G06F 3/0604* (2013.01); *G06F 3/065* (2013.01); *G06F 3/0641* (2013.01); *G06F 3/0679* (2013.01); *G06F 12/082* (2013.01); *G06F 12/0895* (2013.01); *G06F 2212/1024* (2013.01); *G06F 2212/608* (2013.01)

(58) Field of Classification Search
CPC ............... G06F 12/082; G06F 12/0864; G06F 12/0895; G06F 2212/1024; G06F 2212/608; G06F 3/0604; G06F 3/0641; G06F 3/065; G06F 3/0679
USPC ....................................................... 711/128
See application file for complete search history.

(56) References Cited

U.S. PATENT DOCUMENTS

| | | | |
|---|---|---|---|
| 8,924,663 | B2 | 12/2014 | Szczepkowski et al. |
| 9,141,554 | B1 * | 9/2015 | Candelaria .......... H03M 7/3091 |
| 9,612,756 | B1 | 4/2017 | Koli et al. |
| 9,934,172 | B1 | 4/2018 | Koli et al. |
| 10,037,289 | B1 | 7/2018 | Koli et al. |
| 10,268,381 | B1 | 4/2019 | Armangau et al. |
| 10,353,588 | B1 | 7/2019 | Koli et al. |
| 2011/0055471 | A1 | 3/2011 | Thatcher et al. |

(Continued)

*Primary Examiner* — Hashem Farrokh
(74) *Attorney, Agent, or Firm* — BainwoodHuang

(57) ABSTRACT

A computer-implemented method includes caching data from a persistent storage device into a cache. The method also includes caching a physical address and a logical address of the data in the persistent storage device into the cache. The method further includes in response to receiving an access request for the data, accessing the data cached in the cache using at least one of the physical address and the logical address. The embodiments of the present disclosure also provide an electronic apparatus and a computer program product.

20 Claims, 7 Drawing Sheets

(56) References Cited

U.S. PATENT DOCUMENTS

| | | |
|---|---|---|
| 2011/0055621 A1 | 3/2011 | Mandagere et al. |
| 2014/0279941 A1 | 9/2014 | Atkisson |
| 2016/0335192 A1 | 11/2016 | Tajima et al. |
| 2018/0067799 A1* | 3/2018 | Genshaft .............. G06F 11/1068 |
| 2018/0239702 A1* | 8/2018 | Farmahini Farahani .................... G06F 12/0837 |

* cited by examiner

METHOD AND DEVICE FOR OPTIMIZATION OF DATA CACHING

RELATED APPLICATIONS

This application claim priority from Chinese Patent Application Number CN201710250599.8, filed on Apr. 17, 2017 at the State Intellectual Property Office, China, titled "METHOD AND DEVICE FOR OPTIMIZATION OF DATA CACHING" the contents of which is herein incorporated by reference in its entirety.

BACKGROUND

The present disclosure generally relates to a technical field related to a computer system or storage system, and more particularly, to a computer-implemented method and an electronic apparatus.

In a computer system or storage system, management of data entries cached in a cache usually focuses on performing read/write operations through a physical address of the data and indexing data by an offset to a physical address. Therefore, when the system provides a read/write request for the data using a logical address of the data or an offset to a logical address, the cache cannot determine whether the data having the given logical address or given offset to the logical address is cached in the cache.

In this event, the read/write request made through the logical address of the data has to be mapped to the physical address of the data via a mapping function, which normally requires several steps of accessing a persistent storage device. Regarding this, a traditional solution can further provide a write cache function, such that the read/write request made through the logical address may be directly found (also be referred to as hit) in the "write cache record" reserved in the write cache function, without "immediately" mapping from the logical address to the physical address while avoiding redundancy brought by separately creating a cache space for the logical address. Afterwards, the write cache function will map from the logical address to the physical address in background when it is free, which can also be referred to as background renaming.

SUMMARY

The embodiments of the present disclosure provide a computer-implemented method, an electronic apparatus and a computer program product.

In a first aspect of the present disclosure, there is provided a computer-implemented method. The method includes caching data from a persistent storage device into a cache. The method also includes caching a physical address and a logical address of the data in the persistent storage device into the cache. The method further includes in response to receiving an access request for the data, accessing the data cached in the cache using at least one of the physical address and the logical address.

In some embodiments, caching the physical address and the logical address into the cache may include caching the physical address and the logical address using a two-dimensional hash table. In some embodiments, the two-dimensional hash table may include a first dimensional hash table for mapping the physical address to the logical address and the data by using the physical address as a key, and a second dimensional hash table for mapping the logical address to the physical address by using the logical address as a key. In some embodiments, the logical address may correspond to one physical address or be prevented from corresponding to any physical addresses, and the physical address may correspond to at least one logical address or be prevented from corresponding to any logical addresses.

In some embodiments, the method may further include caching an indicator into the cache, and setting the indicator to a positive state or a negative state to indicate whether the data is directly rewritable in the cache. In some embodiments, setting the indicator may include if the physical address corresponds to the logical address only, setting the indicator to the positive state, and if the physical address corresponds to a plurality of logical addresses, or it is undetermined whether the physical address corresponds to the logical address only, setting the indicator to the negative state. In some embodiments, setting the indicator may further include in response to performing at least one of a snapshot operation and a deduplication operation on the data in the storage device, setting the indicator to the negative state.

In some embodiments, caching the data from the storage device into the cache may include in response to a request for a read operation on the data, determining whether the data is cached in the cache, and in response to determining that the data is absent from the cache, duplicating the data from the storage device into the cache and setting the indicator to the negative state.

In some embodiments, accessing the data cached in the cache may include in response to the access request being a rewrite request, determining the state of the indicator, in response to determining that the indicator is in the positive state, directly performing a rewrite operation on the data in the cache, and in response to determining that the indicator is in a negative state, caching data for rewriting in a further position in the cache and setting an indicator indicating whether the data for rewriting is directly rewritable to the positive state.

In a second aspect of the present disclosure, there is provided an electronic apparatus. The electronic apparatus includes at least one processor and at least one memory including computer instructions. The at least one memory and the computer instructions are configured, with the processor, to cause the electronic apparatus to cache data from a persistent storage device into a cache, cache a physical address and a logical address of the data in the persistent storage device into the cache, and in response to receiving an access request for the data, access the data cached in the cache using at least one of the physical address and the logical address.

In a third aspect of the present disclosure, there is provided a computer program product. The computer program product is tangibly stored on a non-volatile computer readable medium and includes machine-executable instructions. The machine-executable instructions, when executed, cause a machine to perform a step of the method according to the first aspect.

BRIEF DESCRIPTION OF THE DRAWINGS

Through the following detailed description with reference to the accompanying drawings, the above and other objectives, features, and advantages of embodiments of the present disclosure will become easy to understand. Several embodiments of the present disclosure will be illustrated by way of example but not limitation in the drawings in which.

Throughout the drawings, same or similar reference numerals are used to represent same or similar components.

DETAILED DESCRIPTION OF EMBODIMENTS

Figure 1:
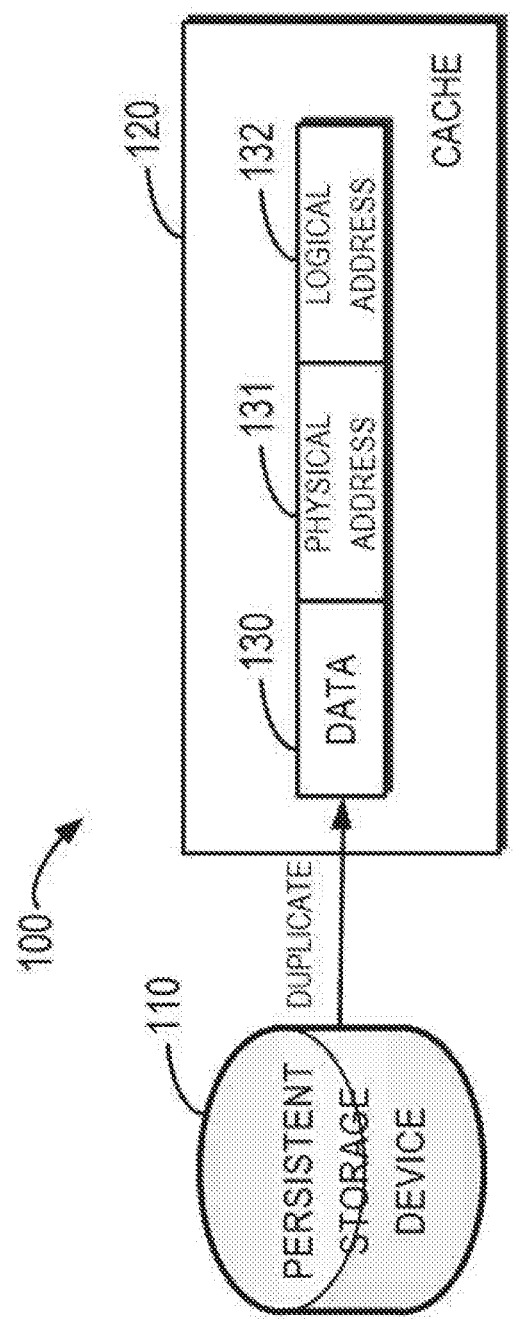
FIG. 1 illustrates a schematic diagram of a storage system according to the embodiments of the present disclosure.

Principles and spirits of the present disclosure will be described with reference to various example embodiments illustrated in the drawings. It should be appreciated that description of those embodiments is merely to enable those skilled in the art to better understand and implement the present disclosure and is not intended for limiting the scope of the present disclosure in any manner.

It should be noted that in the context of the present disclosure, some specific terms may be used to describe some embodiments of the present disclosure for the sake of discussion. However, those skilled in the art will understand that such description is not intended for limiting embodiments of the present disclosure to a particular system or technical environment. The embodiments of the present disclosure can be equivalently applied into other computer systems or storage systems.

As mentioned above, in a traditional solution, a space for the write cache record of the write cache function is limited. Here, the write cache record refers to a space reserved by the write cache function for temporarily storing write requests that have not been mapped to a physical address from a logical address yet. Therefore, being established on a basis of high-level file system characteristics, such as "snapshot," "inline compression," "data redundancy elimination," "write cache" and the like, the traditional solution has one critical decision to be made, that is, how often those data entries in the write cache record should be renamed. In fact, only data entries in the write cache record are potentially to be hit, but they couldn't be kept too long in the data record and have to be removed from the write cache record once the renaming is done.

Two assumptions are considered to further explain the background renaming. One assumption is that if the write cache function takes too long to do renaming, it will have a nice hit rate for recent read/write operations because most data entries are kept in the write cache record. However, the write cache record will be full in this case, and the newly-coming write requests can hardly enhance the performance by means of "write cache." Thus, the performance of new requests will become extremely bad, even worse than when the write cache function is not enabled. Another assumption is that the write cache function quickly renames once it is free. In this way, the write cache record contains very few data entries that are potentially to be hit, which contributes to bad hit rate as well.

In practice, as shown in the table below, no matter the frequency of renaming is short or long, the write cache function has to select one. In the table, the recent R/W means the logical read/write requests that satisfy a good spatial locality, while the non-recent R/W means the requests whose addresses are not in the recent cached entry list, which is less likely to be hit. Here, a logical read/write indicates I/O requests through a logical address from a storage system at a client side, the address being comprised of <file system number, root index number, offset address>, for example. Correspondingly, a physical read/write denotes I/O requests for persistent data in a physical disk when the mapping from a logical address to a physical address is completed, which consisting of a physical address offset, for example.

TABLE 1

| Renaming frequency | [recent R/W] | [non-recent R/W] |
|---|---|---|
| Short (hard to choose) | Bad | Good |
| Long (hard to choose) | Good | Bad |

The reason why the traditional solution has the above problem is that the data entries in the cache is organized through a traditional hash table indexed by a physical address. Thus, it can be asked and quickly responds whether it contains the data having a physical address if the physical address is provided. However, if the data entries in the cache are accessed by a logical address, it cannot determine by itself whether the data having the logical address is cached or not.

To at least partially solve the above and other potential problems, the embodiments of the present disclosure provide a computer-implemented method, an electronic apparatus and a computer program product, such that the above various situations can be improved and the data in the cache can be more readily managed. As illustrated in the following table, with the embodiments of the present disclosure, the renaming can always be recommended to be performed without bringing negative influence on the recent R/W in the above discussed specific technical scenario.

TABLE 2

| Renaming frequency | [recent R/W] | [non-recent R/W] |
|---|---|---|
| Short (recommended) | Good | Good |
| Long (not recommended) | Good | Bad |

Specifically, the embodiments of the present disclosure add logical address information of the data for each data entry in the cache, and also add shared indicator information in some embodiments. In some embodiments, by organizing data and its related information into a special two-dimensional hash table, data contents can be found through both the physical address and the logical address without adding time complexity and spatial complexity. With such improvement by the embodiments of the present disclosure, the cache can search for data by both the physical address and the logical address. Meanwhile, it is determined whether the write operation has a possibility of being optimized based on the shared state of the indicator.

Furthermore, in the embodiments provided with the shared indicator, the shared indicator may assist the cache to distinguish whether a physical address is uniquely mapped to a logical address. This will further prevent newly-coming rewrite requests from performing more repeated mappings from the logical address to the physical address. The general concept of the embodiments of the present disclosure will be described below with reference to FIG. 1.

FIG. 1 illustrates a schematic diagram of a storage system 100 according to the embodiments of the present disclosure. As shown in FIG. 1, the storage system 100 may include a persistent storage device 110 and a cache 120. In operations of the cache system 100, data 130 stored in the persistent storage device 110 may be copied into the cache 120, so that the data 130 may be more rapidly accessed in the cache 120 during in subsequent operations, without repeatedly locating the data 130 by analyzing an index in the persistent storage device 110.

To realize access to the data 130 in the cache 120, a physical address 131 and a logical address 132 of the data 130 in the persistent storage device 110 are also cached in the cache 120 with the data 130, according to embodiments of the present disclosure. Therefore, the storage system 100 may access the data 130 in the cache 120 through at least one of the physical address 131 and the logical address 132 of the data 130.

It should be understood that FIG. 1 is a highly simplified schematic diagram and only briefly shows units or components closely related to the present disclosure. The aim is to generally explain a technical environment of the embodiments of the present disclosure and is not intended for restricting the scope of the present disclosure in any manner. In other embodiments, the storage system 100 may also include or relate to more units or components, the data organization fashion in the cache 120 may have a more complex data structure, the persistent storage device 110 and the cache 120 may have a more complicated interaction mechanism, and the like. A method according to the embodiments of the present disclosure will be described below in details with reference to FIGS. 2-5.

Figure 2:
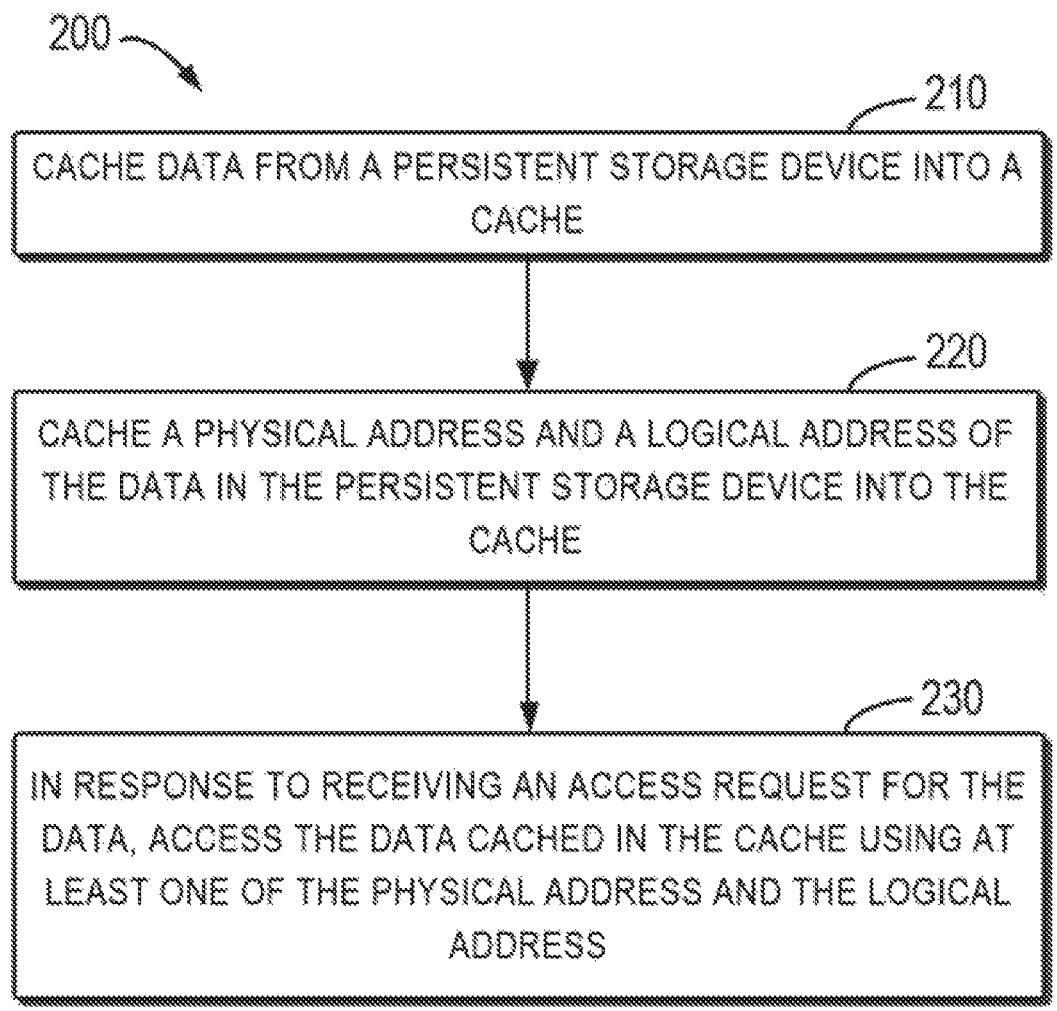
FIG. 2 illustrates a flowchart of a method according to the embodiments of the present disclosure.

FIG. 2 illustrates a flow chart of a method 200 according to the embodiments of the present disclosure. In some embodiments, the method 200 may be performed by the storage system 100 depicted in FIG. 1, for example, may be performed by one or more units or modules in the storage system 100.

At 210, the storage system 100 caches the data 130 in the persistent storage device 110 into the cache 120. Those skilled in the art will understand that the data 130 may be cached in the cache 120 due to various reasons or through all kinds of interaction mechanism between the persistent storage device 110 and the cache 120. The embodiments of the present disclosure are not restricted in this regard.

For example, a user of the storage system 100 may send a read request for the data 130 to the storage system 100 via a client. In this case, in response to a request for a read operation on the data 130, the storage system 100 may determine whether the data 130 is cached in the cache 120. On one hand, in response to determining that the data 130 is already cached in the cache 120, the storage system 100 may directly perform the read operation on the data 130 in the cache 120. On the other hand, in response to determining that data 130 is not cached in the cache 120, the storage system 100 may duplicate the data 130 from the persistent storage device 110 into the cache 120.

Continuing to refer to FIG. 2, at 220, the storage system 100 caches the physical address 131 and the logical address 132 of the data 130 in the persistent storage device 110 into the cache 120. Those skilled in the art will understand that the storage system 100 may cache the physical address 131 and the logical address 132 of data 130 with the data 130 into the cache 120 using various kinds of data organization fashions. The embodiments of the present disclosure are not restricted in this regard. An organization fashion for implementing the function according to the embodiments of the present disclosure will be described below with reference to FIG. 3.

Figure 3:
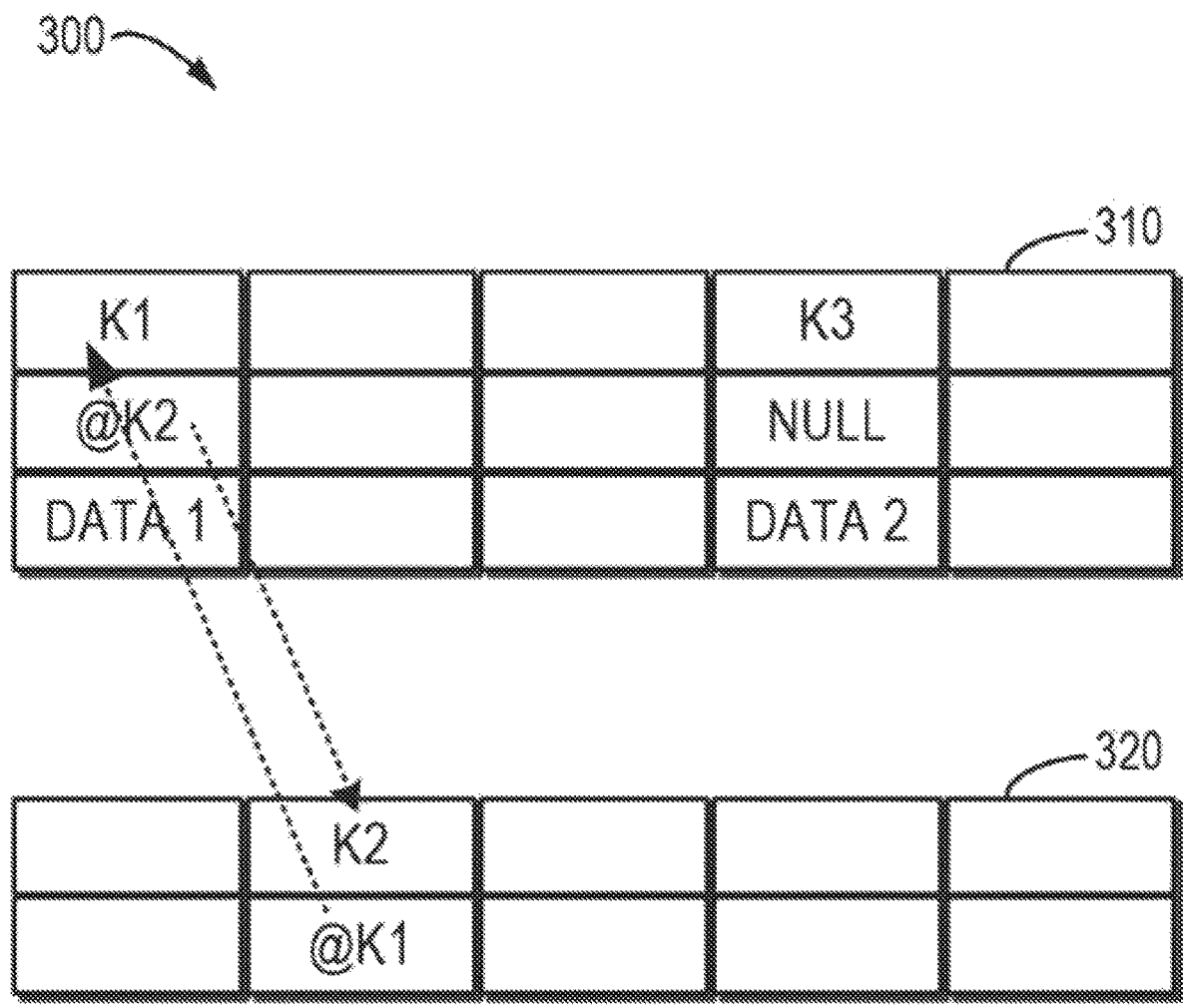
FIG. 3 illustrates a schematic diagram of a two-dimensional hash table according to the embodiments of the present disclosure.

FIG. 3 illustrates a schematic diagram of a two-dimensional hash table 300 according to the embodiments of the present disclosure. Those skilled in the art will understand that the cache 120 may use the physical address 131 of the data 130 as index to form a hash table according to a relatively simple way. This manner can perform operations such as inserting/finding/removing data entries with approximately O(1) complexity in time. On this basis, the cache 120 may construct a two-dimensional hash table 300 to further use the logical address 132 of the data 130 as an index to expand into each data entry, according to the embodiments of the present disclosure.

Specifically, as shown in FIG. 3, the cache 120 may use a pair of hash tables 310 and 320 to implement the two-dimensional hash table 300 for caching the data 130 and its physical address 131 and logical address 132. In particular, the two-dimensional hash table 300 may include a first dimensional hash table 310 and a second dimensional hash table 320. The first dimensional hash table 310 may be used to map the physical address 131 to the logical address 132 and the data 130 by using the physical address 131 as a key. The second dimensional hash table 320 may be used to map the logical address 132 to the physical address 131 by using the logical address 132 as a key. FIG. 3 employs dotted arrows to depict the mapping relationships between the physical address 131 and the logical address 132.

For example, FIG. 3 schematically depicts two entries in the first dimensional hash table 310. One entry stores data 1, the physical address (denoted as a key K1) of data 1 and the logical address (denoted as @K2) of data 1. As indicated by the dotted arrows in FIG. 3, K1 is mapped to an entry in the second dimensional hash table 320 that takes the logical address K2 of data 1 as a key value. Furthermore, the entry K2 in the second dimensional hash table 320 is also mapped to the above mentioned entry in the first dimensional hash table 310. By such mapping relationships, the data 130 may be accessed through any one of the physical address 131 and the logical address 132.

It will be understood that the two-dimensional hash table 300 does not add extra time complexity and spatial complexity. Compared with a normal one-dimensional hash table, the two-dimensional hash table 300 only doubles the space for storing the keys, which still does not increase spatial complexity because a size of the logical address 132 serving as the index is far smaller than the data 130 of a binary large object (for example, 8K).

In some embodiments, for example in an embodiment based on an unity storage layout, the corresponding mapping relationships between the physical address 131 and the logical address 132 may have the following rules. In one aspect, the logical address 132 may correspond to one physical address 131 only, to ensure that the logical address 132 may be uniquely mapped to the physical address 131, and thereby the data 130 may be accessed through the logical address 132. Besides, in some situations, the logical address 132 may correspond to no physical addresses or may be blocked to locate to any physical addresses, for example, in a scenario in which the inline compression is enabled in some storage systems. In this event, the logical address 132 cannot be used for accessing the data 130 in the cache 120 and the data 130 in the cache 120 can only be accessed through the physical address 131.

In another aspect, the physical address 131 may correspond to at least one logical address 132. In other words, the physical address 131 may correspond to a plurality of logical addresses including the logical address 132. Herein, this situation may be referred to as the data 130 or the physical address 131 being shared. If the plurality of logical addresses is mapped to the same physical address 131, the storage system 100 can only record one of them in consideration of special complexity. However, it should be appreciated that storing all or part of logical addresses is feasible, which only costs a slightly more storage space and implementation complexity. Additionally, in some cases, the physical address 131 may not correspond to any logical addresses, for example, in a scenario where the logical address is not enabled, such as the above mentioned scenario in which the inline compression is enabled in some storage systems.

According to the above mapping rules, it may be expected that a valid two-dimensional hash table has two forms of data entries. One type of data entry is in the form of (key 1, key 2, data value), for example, which indicates both the key 1 pointing to the data value in the first dimensional hash table 310 and the key 2 pointing to the data value in the second dimensional hash table 320. One example is the entry of the data 1 in the first dimensional hash table 310 in FIG. 3. Another type of data entry is in the form of (key 3, null, data value), for example, which only indicates the key 3 pointing to the data value in the first dimensional hash table 310. One example is the entry of the data 2 in the first dimensional hash table 310. The logical address of the data 2 is set to be null, which for example represents that the mapping from the logical address to the physical address is blocked and the data 2 can only be accessed through the physical address K3.

Figure 4:
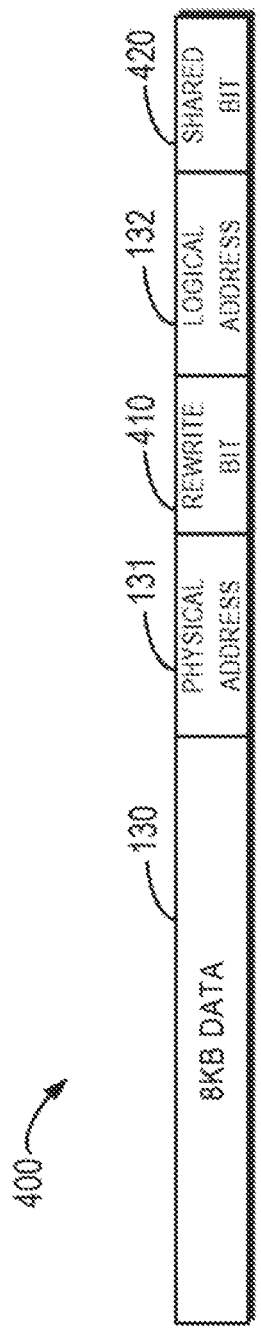
FIG. 4 illustrates a schematic diagram of a structure of data entries in a cache according to the embodiments of the present disclosure.

FIG. 4 illustrates a schematic diagram of a structure of the data entry 400 in the cache 120 according to the embodiments of the present disclosure. As shown in FIG. 4, one data entry 400 in the cache 120 may include data 130, a physical address 131 of the data 130, a logical address 132 of the data 130, a rewrite bit 410 and a shared bit 420. The rewrite bit 410 is used to indicate whether the data 130 in the cache 120 has been rewritten and the rewrite has not been updated into the persistent storage device 110 yet. In addition, the shared bit 420 is used to indicate whether the physical address 131 of the data 130 is shared by a plurality of logical addresses including the logical address 132. Herein, the shared bit 420 is also termed as a shared indicator 420 or an indicator 420 for short.

It will be understood that although FIG. 4 depicts the rewrite bit 410 and the shared bit 420 as one bit, they may also be set to other lengths in other embodiments. The embodiments of the present disclosure are not limited in this regard. Moreover, although FIG. 4 schematically depicts the data 130 as a 8K binary data block, the data 130 may have other sizes in other embodiments. The embodiments of the present disclosure are not restricted in this regard.

As further explained in the following, the storage system 100 may indicate whether the data 130 is directly rewritable in the cache 120 by caching the indicator 420 in the cache 120 and setting the indicator 420 to a positive state or a negative state. Therefore, compared with a conventional solution, a large amount of unnecessary mapping from a logical address to a physical address and background renaming may be avoided by setting the indicator 420.

In some embodiments, the indicator 420 is set to indicate "non-shared" only if it is sure that the logical address 132 is uniquely mapped to the physical address 131. One example is the data generated by a new write split operation, i.e., the data for rewriting stored in a further position in the cache 120 since the rewrite cannot be directly performed in the cache 120.

Furthermore, the indicator 420 should be set to indicate "shared" in any other cases, including in a situation that it is undetermined whether the physical address 131 of the data 130 is shared or not. For the data copied into the cache 120 from the persistent storage device 110, whether the data is shared or not is unknown due to lack of information provided from the persistent storage device 110. Therefore, the storage system 100 may set the indicator 420 for the data to indicate "shared."

In the embodiments that involve performing a snapshot operation and a deduplication operation of the data 130, in response to performing at least one of the snapshot operation or the deduplication operation on the data 130 in the persistent storage device 110, the storage system 100 may set the indicator 420 for the data 130 to indicate "shared."

Specifically, after a snapshot is implemented for example on a certain storage disk of the storage system 100, the indicator 420 for an existing data entry belonging to the storage disk in the cache 120 should be set to indicate "shared." It will be appreciated that this process is quick because the number of data entries in the cache 120 is limited and all the data to be accessed is completed in the memory. For example, in the case that the memory size is 512 MB and the size of the data in the cache 120 is 8 KB, it is calculated 512 MB/8 KB=64K=6*$10^4$ and the time cost is about 0.6 microsecond only.

In addition, in the deduplication operation, regardless of inline deduplication or background deduplication, the deduplication operation merges two physical addresses into one physical address shared by a plurality of logical addresses. Therefore, the indicator 420 for the data involved in the deduplication should be set to indicate "shared" after the deduplication. For example, in a practical implementation, the management may only need the several rows of codes below. Here, the MCC cache refers to a one-dimensional cache originally dedicated to the physical address. By extending with the logical address, the shared indicator and the rewrite indicator, a two-way positioning that uses either of the physical address and the logical address is supported.

```
if (compare_data(pa1, pa2) == true) {
        Base::decide_to_merge_physical_blocks(pa1, pa2);
        // extend the following two lines to support
        If (MCC[ra1] != NULL) MCC[ra1].shared = true;
        If (MCC[ra2] != NULL) MCC[ra2].shared = true;
}
```

Returning to refer to FIG. 2, in the case that the data 130 and its physical address 131 and logical address 132 are cached to the cache 120, at 230, in response to receiving an access request for the data 130, the storage system 100 employs at least one of the physical address 131 and the logical address 132 to access the data 130 cached in the cache 120.

In some embodiments, if the access request is a read request for the data 130, the storage system 100 may directly read out the data 130 in the cache 120. In the case that the indicator 420 is configured, the storage system 100 directly reading the data 130 from the cache 120 is not influenced no matter the indicator 420 is in the positive state or in the negative state.

In some embodiments, in the case that the indicator 420 is configured, the storage system 100 may determine the state of the indicator 420 in response to the access request being a rewrite request. Further, in response to determining that the indicator 420 is in the positive state (i.e., non-shared), the storage system 100 may directly perform the rewrite operation on the data 130 in the cache 120. Otherwise, in response to determining that the indicator 420 is in the negative state (i.e., shared), the storage system 100 may cache the data for rewriting in a further position in the cache 120 and set the indicator 420 indicating whether the data for rewriting may be directly rewritten to the positive state (i.e., non-shared).

In other words, according to some embodiments of the present disclosure, no matter the entries of the data 130 in the cache 120 are shared or not, they may be directly read. Moreover, the entries of the data 130 in the cache 120 are directly rewritable only if they are not shared. That is, if the write request locates to the "non-shared" cache data 130, the direct write operation on the physical cache 120 may also be implemented through the logical address 132 only.

In practice, the access operations according to the embodiments of the present disclosure may be described using pseudo-codes as follows, wherein "la" represents the logical address 132 of the data 130 and "pa" represents the physical address 131 of the data 130. In addition, in the embodiment provided with a rewrite bit 410 and using the Least Recently Used Algorithm LRU, if the direct rewrite is performed, the LRU needs to be updated and the rewrite bit 410 needs to be set, which has been clarified in the pseudo-code.

Read Function:

```
Derived::Read_8k(la1) {
    if (MCC[la1] != NULL)
        return MCC[la1].data; // direct read
    else {
        ans = Base::Read_8k(la1); // read from persistent storage
device (unknown whether it is shared)
        MCC[la1].shared = true; // (assuming it is shared)
        return ans;
    }
}
```

Rewrite Function:

```
Derived::Write_8k(la1, data) {
    Base::wait_for_snap_done( );
    if (MCC[la1] != NULL && MCC[la1].shared == false) {
        MCC[la1].data = data; // direct rewrite
        MCC.update_LRU( );
        MCC[la1].dirty = true;
    } else {
        Base::Write_8k(la1, data);
        MCC[la1].shared = false; // configure the data for rewrite
as non-shared
    }
}
```

Figure 5:
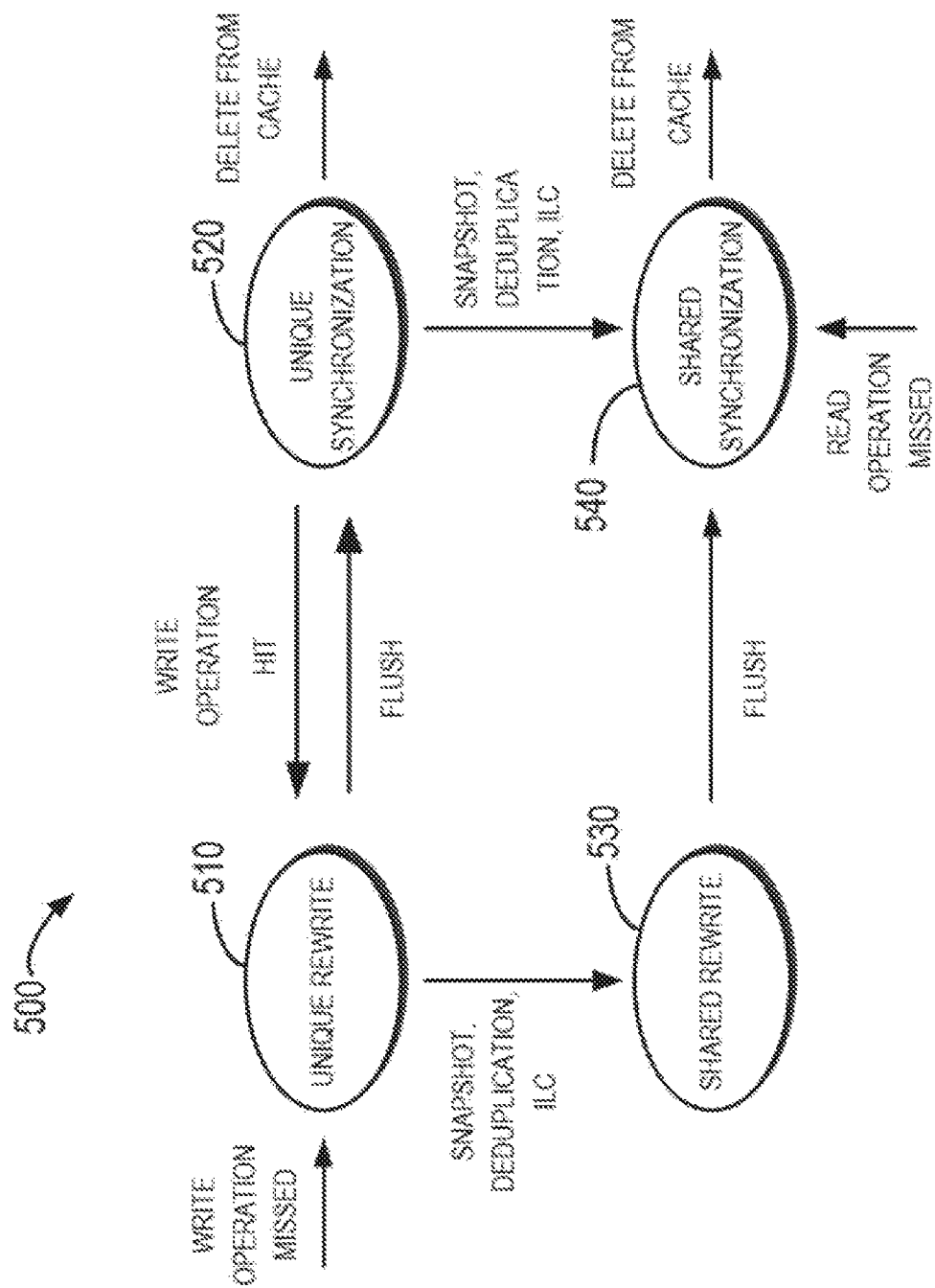
FIG. 5 illustrates a state transition diagram of an operation process according to the embodiments of the present disclosure.

FIG. 5 illustrates a state transition diagram 500 of an operation process according to the embodiments of the present disclosure. As shown in FIG. 5, the data 130 cached in the cache 120 may have four states, i.e., "unique rewrite" 510, "unique synchronization" 520, "shared rewrite" 530 and "shared synchronization" 540. "Unique" in the states 510-540 means that the physical address 131 of the data 130 is uniquely mapped to the logical address 132, while "shared" means that the physical address 131 of the data 130 may be mapped to other logical addresses in addition to the logical address 132.

Moreover, "rewrite" in the states 510-540 means that the data 130 has been rewritten in the cache 120 and the rewrite has not been synchronized to the persistent storage device 110 yet, which is inconsistent with the data 130 recorded in the persistent storage device 110. In contrast, "synchronization" means that the data 130 in the cache 120 is consistent with the data 130 recorded in the persistent storage device 110.

As illustrated, in response to a write operation from a client being not hit for example, the storage system 100 may cache the data 130 for rewriting certain data in a certain position in the cache 120. As the data 130 may be determined as not shared at this moment, the state of the data 130 is the "unique rewrite 510." If the data 130 is flushed, it means that the rewrite performed on the data in the cache 120 is synchronized to the persistent storage device 110, and the data 130 transitions from the "unique rewrite 510" state to the "unique synchronization 520" state. On the contrary, in response to the write operation from the client being hit in the cache 120 for example, the storage system 100 may directly rewrite the data 130 in the cache 120, and the data 130 switches from the "unique synchronization 520" state to the "unique write 510" state accordingly.

Similarly, if the cache 120 is flushed, the data in the "shared rewrite 530" state may be switched to the "shared synchronization 540" state. Additionally, in response to performing operations, such as the snapshot, the deduplication or the ILC and the like, on the data 130, the "unique write 510" state and the "unique synchronization 520" state may transition to the "shared rewrite 530" and the "shared synchronization 540," respectively.

Furthermore, in response to a read operation from the client being not hit for example, the storage system 100 may duplicate the data 130 from the persistent storage device 110 to the cache 120. Because the data 130 cannot be determined as shared or not at this point, the storage system 100 may set the state of the data 130 to the "shared synchronization 540." At last, the data 130 in the "unique synchronization 520" or "shared synchronization 540" state may be deleted from the cache 120, for example, based on the Least Recently Used Algorithm LRU.

In the following, the effectiveness of the method of the embodiments of the present disclosure is proved through simple analysis. First of all, as further explained, the embodiments of the present disclosure have a higher hit rate than the traditional solution in most cases. The higher hit rate not only makes it faster to return a result to the user (implying better performance), and it also contributes to less consumption of the write cache record of the write cache function, less stress and many other advantages.

For example, in some embodiments, the embodiments of the present disclosure have more direct read/write hit after renaming of the write cache function. The direct read/write hit refers to processing the read/write operation without the mapping from the logical address to the physical address and reserving the entries of the write cache function. Instead, it directly queries or modifies the cached data. For the traditional "write cache" solution, it requires renaming at a given interval frequency to reclaim space of the write cache. Once the renaming of the write cache function is done, all the data entries are certainly not hit-able by either read or write because the logical address mapping is cleaned to free more space of the write cache record. In contrast, the embodiments of the present disclosure enables both read and write to be hit-able because the cache 120 (such as the MCC cache) contains the mapping of the logical address 131 before and after renaming of the write cache function.

For another example, the embodiments of the present disclosure may realize more direct rewrite hits. For the traditional solution, if the rewrite request is not within the write cache record of the write cache function, it will always reserve the space of the write cache record for a write split even if it is in fact non-shared. Therefore, both the mapping from the logical address to the physical address for the new address and the de-allocating for the old address are inevitable. By contrast, the embodiments of the present disclosure may easily process all non-shared situations.

Moreover, it is seen from the following discussion that non-shared data entries are common in the data entry list of the cache 120 (for example, the MCC cache), which plays an important role in increasing the direct rewrite hits.

Specifically, if a rewrite request through the logical address 132 is reported as shared, the first write on this logical address is not hit-able, so a write split is required. However, the write split makes the logical address 132 map to a further physical address that is certainly not shared, so for all the subsequent write requests on the logical address 132, it will continuously satisfy the conditions for the direct write.

In order to conduct a simple quantitative analysis, it is assumed that there are A write requests on a fixed logical address and B snapshots are performed during the A write requests. In a real scenario, B is obviously much smaller than A, so it may be assumed B<<A. In this event, only (B+1) write requests are not directly rewriteable, and the rest A−(B+1) write requests are directly rewritten.

In summary, the embodiments of the present disclosure make logical read operations hit-able in all cases and make logical write operations hit-able when a data entry is non-shared, which situation is common.

TABLE 3

|  | Shared | Non-shared |
| --- | --- | --- |
| Direct Read | Hit-able | Hit-able |
| Direct Write | Not hit-able | Hit-able |

Figure 6:
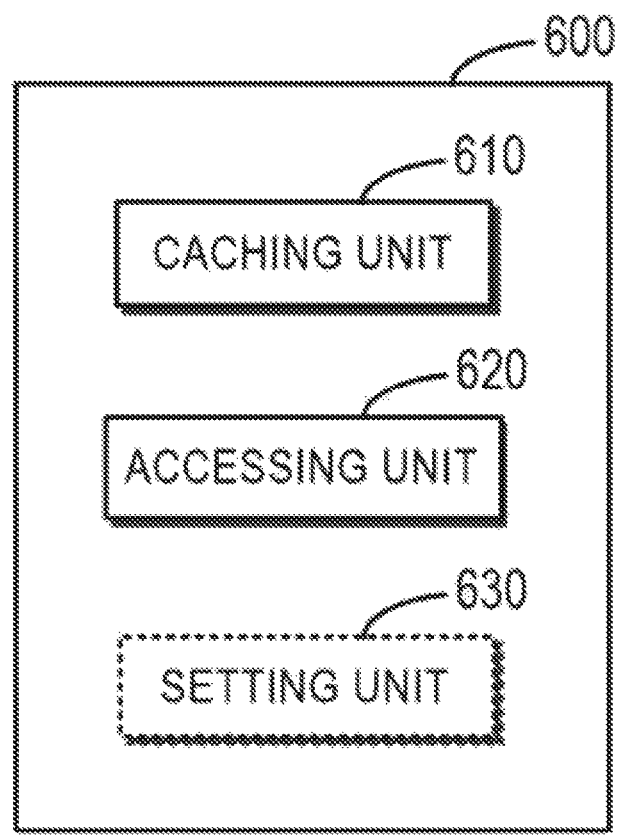
FIG. 6 illustrates a block diagram of an apparatus according to the embodiments of the present disclosure.

FIG. 6 schematically illustrates a block diagram of an apparatus 600 according to the embodiments of the present disclosure. Those skilled in the art may understand that FIG. 6 only shows units or components closely related to the present disclosure in the apparatus 600. In some implementations, the apparatus 600 may also include other functional units or components for its normal functions.

In addition, necessary connection relationships may present between various units or components shown in FIG. 6. However, FIG. 6 does not depict these connection relationships for concision. In some embodiments, the apparatus 600 may be configured to implement the method 200 described above with reference to the FIG. 2. In FIG. 6, optional units or components are depicted using dotted blocks.

As shown in FIG. 6, the apparatus 600 includes a caching unit 610 and an accessing unit 620. The caching unit 610 is configured to cache the data 130 in the persistent storage device 110 into the cache 120, and is also configured to cache the physical address 131 and the logical address 132 of the data 130 in the persistent storage device 110 into the cache 120. The accessing unit 620 is configured to, in response to receiving an access request for the data 130, access the data 130 cached in the cache 120 using at least one of the physical address 131 and the logical address 132.

In some embodiments, the caching unit 610 may also be configured to cache the physical address 131 and the logical address 132 using a two-dimensional hash table 300. In some embodiments, the two-dimensional hash table 300 may include a first dimensional hash table 310 for mapping the physical address 131 to the logical address 132 and the data 130 by using the physical address 131 as the key K1, and a second dimensional hash table 320 for mapping the logical address 132 to the physical address 131 by using the logical address 132 as the key K2. In some embodiments, the logical address 132 may correspond to one physical address or not correspond to any physical addresses, and the physical address 131 may correspond to at least one logical address or not correspond to any logical addresses.

In some embodiments, the caching unit 610 may also be configured to cache the indicator 420 in the cache 120, and set the indicator 420 to a positive state or a negative state to indicate whether the data 130 is directly rewritable in the cache 120. In some embodiments, the caching unit 610 may also be configured, if the physical address 131 corresponds to the logical address 132 only, to set the indicator 420 to the positive state, and if the physical address 131 corresponds to a plurality of logical addresses, or it is undetermined whether the physical address 131 corresponds to the logical address 132 only, to set the indicator 420 to the negative state.

In some embodiments, the apparatus 600 may also include a setting unit 630, which is configured to, in response to performing at least one of a snapshot operation and a deduplication operation on the data 130 in the persistent storage device 110, to set the indicator 420 to the negative state.

In some embodiments, the caching unit 610 may also be configured to, in response to a request for a read operation on the data 130, determine whether the data 130 is cached in the cache 120 or not. The caching unit 610 may be configured to, in response to determining that the data 130 is absent from the cache 120, duplicate the data 130 from the persistent storage device 110 into the cache 120 and set the indicator 420 to the negative state.

In some embodiments, the caching unit 610 may also be configured to, in response to the access request being a rewrite request, determine the state of the indicator 420. The caching unit 610 may be configured to, in response to determining that the indicator 420 is in the positive state, directly perform a rewrite operation on the data 130 in the cache 120, and in response to determining that the indicator 420 is in the negative state, cache data for rewriting in a further position in the cache 120 and set an indicator indicating whether the data for rewriting is directly rewritable to the positive state.

Figure 7:
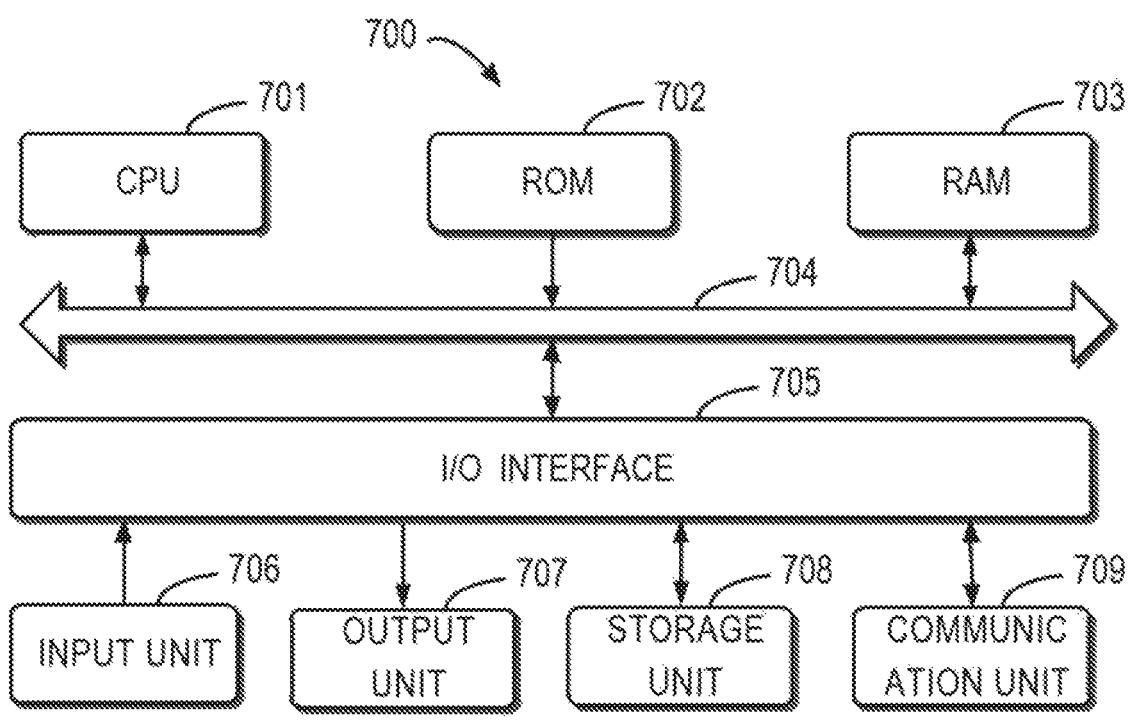
FIG. 7 illustrates a block diagram of a device that can be used for implementing the embodiments of the present disclosure.

FIG. 7 schematically illustrates a block diagram of a device 700 for implementing embodiments of the present disclosure. As shown in FIG. 7, the device 700 includes a central process unit (CPU) 701, which may execute various suitable actions and processing based on the computer program instructions stored in the read-only memory (ROM) 702 or computer program instructions loaded in the random-access memory (RAM) 703 from the storage unit 708. The RAM 703 may also store all kinds of programs and data required by the operation of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 707, such as keyboard, mouse and the like; an output unit 707, for example, various kinds of display and loudspeakers etc.; a storage unit 708, such as disk and optical disk etc.; and a communication unit 709, such as network card, modem, wireless transceiver and the like. The communication unit 709 allows the device 700 to exchange information/data with other devices via the computer network, such as Internet, and/or various telecommunication networks.

The above described each procedure and processing, such as method 200, may be executed by the processing unit 701. For example, in some embodiments, the method 200 may be implemented as a computer software program tangibly included in the machine-readable medium, for example, storage unit 708. In some embodiments, the computer program may be partially or fully loaded and/or mounted to the device 700 via ROM 702 and/or communication unit 709. When the computer program is loaded to RAM 703 and executed by the CPU 701, actions in one or more blocks of the above describe method 200 may be implemented.

The embodiments of the present disclosure provide a computer-implemented method, an electronic apparatus and a computer program product. In some embodiments, there is also provided a data structure for optimizing cache hit rate, which is directed to both read operations and write operations. Compared with the existing data structure (for example, the MCC model) in the cache, the embodiments of the present disclosure have the following advantages.

First of all, the embodiments of the present disclosure improve a hit rate of a read operation, for example, no matter renaming of the write cache function cleans the cache or not. Besides, the embodiments of the present disclosure improve a hit rate of a write operation, and can support direct rewrite without a slow mapping from the logical address to the physical address in most cases. Moreover, the embodiments of the present disclosure may have less pressure while performing background flushing of the write cache function, since more write operations may be intelligently analyzed as no longer to be reserved in the write cache record of the write cache function.

Furthermore, the embodiments of the present disclosure can simply work with the inline compression, and can also simply work with the snapshot function and deduplication function. In addition, all the operations of the embodiments of the present disclosure still remain O(1) in both time complexity and spatial complexity, and the sequence of processing data write can also satisfy consistency requirement. Furthermore, the embodiments of the present disclosure do not need to alter the layout of the persistent storage device, so it can be easily implemented on the existing products. Finally, the embodiments of the present disclosure are also applicable to a B-tree based architecture, such as Cyclone.

As used herein, the term "includes" and its variants are to be read as open-ended terms that mean "includes, but is not limited to." The term "based on" is to be read as "based at least in part on." The term "one embodiment" and "the embodiment" are to be read as "at least one embodiment." As used herein, the term "determine" encompasses a variety of actions, for example, "determine" may include computation, calculation, export, research, look up (such as looking up in a table, a database or a further data structure), and find out etc. Additionally, "determine" may include receiving (for example, receiving information), accessing (for example, accessing data in the memory) and the like. Moreover, "determine" may include parsing, choice, selection and establishing etc.

It should be noted that embodiments of the present disclosure can be implemented by hardware, software or combinations of software and hardware. The hardware portion may be implemented by special logic; the software portion may be stored in the memory executed by a suitable instruction execution system, such as microprocessor or dedicated design hardware. Those skilled in the art may understand that the above device and method may be implemented by using computer executable instructions and/or including in the control codes of the processor, for example, providing such codes on the programmable memory or data carriers of optical or electronic signal carriers.

Further, although operations of the method of the present disclosure are described in a particular order in the drawings, it does not require or imply that these operations are necessarily performed according to this particular sequence, or a desired outcome may only be achieved by performing all shown operations. On the contrary, the execution order for the steps as depicted in the flowcharts may be varied. Additionally or alternatively, some steps may be omitted and a plurality of steps may be combined into one step for execution, and/or one step may be decomposed into a plurality of steps for execution. It should also be noted that features and functions of two or more apparatuses according to the present disclosure may be materialized in one apparatus whereas features and functions of one apparatus described above may be further divided and materialized by a plurality of apparatuses.

Although the present disclosure has been described with reference to several detailed embodiments, it should be understood that the present disclosure is not limited to the disclosed embodiments. The present disclosure is intended to cover various modifications and equivalent arrangements included in the scope of the appended claims. The scope of the appended claims meets the broadest explanations and covers all such modifications and equivalent structures and functions.

What is claimed is:

1. A computer-implemented method, comprising:
caching a data entry into a cache, the data entry including data from a persistent storage device, a physical address of the data, a logical address of the data, and access state information, the data being accessible to a requestor issuing an access request using either the physical address or the logical address; and
managing usage and status of the data entry based on the access state information, including:
upon performing a flush operation, transitioning the data entry from a rewrite state to a synchronized state, the data entry in the rewrite state being directly rewriteable, the data entry in the synchronized state being subject to later deletion to make room for a new data entry in the cache; and
upon performing a snapshot, deduplication and/or compression operation, transitioning the data entry from a unique state to a shared state, the data entry in the shared state being associated with a plurality of distinct logical addresses, and the data entry in the unique state being writeable and, upon being written when in a unique-synchronized state, transitioning from the unique-synchronized state to a unique-rewrite state.

2. The computer-implemented method of claim 1, wherein the access state information identifies two access state dimensions as unique/shared and rewrite/synchronized, resulting in four access states being unique-rewrite, unique-synchronized, shared-rewrite, and shared-synchronized.

3. The computer-implemented method of claim 2, wherein the unique-rewrite state is entered in response to both (1) a write miss that results in the caching of the data entry in the cache and (2) a write hit when the data entry is in the cache in the unique-synchronized state.

4. The computer-implemented method of claim 2, wherein the data entry is cached in the cache in response to both (1) a write miss, which sets the access state to the unique-rewrite state, and (2) a read miss, which sets the access state to the shared-synchronized state.

5. The computer-implemented method of claim 1, wherein caching the physical address and the logical address into the cache comprises caching the physical address and the logical address using a two-dimensional hash table, the two-dimensional hash table including a first dimensional hash table for mapping the physical address to the logical address and the data by using the physical address as a key, and a second dimensional hash table for mapping the logical address to the physical address by using the logical address as a key.

6. The computer-implemented method of claim 1, wherein the access state information provides for respective conditions in which:
the logical address corresponds to one physical address or is prevented from corresponding to any physical addresses; and
the physical address corresponds to at least one logical address or is prevented from corresponding to any logical addresses.

7. The computer-implemented method of claim 6, wherein the access state information includes a unique/shared indicator, and:
if the physical address corresponds to the logical address only, the unique/shared indicator is set to a unique state; and
if the physical address corresponds to a plurality of logical addresses, or it is undetermined whether the physical address corresponds to the logical address only, the unique/shared indicator is set to a shared state.

8. The computer-implemented method of claim 7, wherein:
in response to performing at least one of a snapshot operation and a deduplication operation on the data in the storage device, the unique/shared indicator is set to the shared state.

9. The computer-implemented method of claim 7, wherein caching the data from the storage device into the cache comprises:
in response to a request for a read operation on the data, determining whether the data is cached in the cache; and
in response to determining that the data is absent from the cache:
duplicating the data from the storage device into the cache; and
setting the unique/shared indicator to the shared state.

10. The computer-implemented method of claim 7, wherein accessing the data cached in the cache comprises:
in response to the access request being a rewrite request, determining whether the unique/shared indicator is in the unique state or the shared state;
in response to determining that the unique/shared indicator is in the unique state, directly performing a rewrite operation on the data in the cache; and
in response to determining that the unique/shared indicator is in the shared state,
caching data for rewriting in a further position in the cache, and
setting a separate indicator indicating whether the data for rewriting is directly rewritable to a positive state.

11. An electronic apparatus, comprising:
at least one processor; and
at least one memory including computer instructions, the at least one memory and the computer instructions being configured, with the processor, to cause the electronic apparatus to:
cache a data entry into a cache, the data entry including data from a persistent storage device, a physical address of the data, a logical address of the data, and access state information, the data being accessible to a requestor issuing an access request using either the physical address or the logical address; and
manage usage and status of the data entry based on the access state information, including:
upon performing a flush operation, transitioning the data entry from a rewrite state to a synchronized state, the data entry in the rewrite state being directly rewriteable, the data entry in the synchronized state being subject to later deletion to make room for a new data entry in the cache; and
upon performing a snapshot, deduplication and/or compression operation, transitioning the data entry from a unique state to a shared state, the data entry in the shared state being associated with a plurality of distinct logical addresses, and the data entry in the unique state being writeable and, upon being written when in a unique-synchronized state, transitioning from the unique-synchronized state to a unique-rewrite state.

12. The electronic apparatus of claim 11, wherein the access state information identifies two access state dimensions as unique/shared and rewrite/synchronized, resulting in four access states being unique-rewrite, unique-synchronized, shared-rewrite, and shared-synchronized.

13. The electronic apparatus of claim 12, wherein the unique-rewrite state is entered in response to both (1) a write miss that results in the caching of the data entry in the cache and (2) a write hit when the data entry is in cache in the unique-synchronized state.

14. The electronic apparatus of claim 12, wherein the data entry is cached in the cache in response to both (1) a write miss, which sets the access state to the unique-rewrite state, and (2) a read miss, which sets the access state to the shared-synchronized state.

15. The electronic apparatus of claim 11, wherein caching the physical address and the logical address into the cache comprises caching the physical address and the logical address using a two-dimensional hash table, the two-dimensional hash table including a first dimensional hash table for mapping the physical address to the logical address and the data by using the physical address as a key, and a second dimensional hash table for mapping the logical address to the physical address by using the logical address as a key.

16. The electronic apparatus of claim 11, wherein the access state information provides for respective conditions in which:

the logical address corresponds to one physical address or is prevented from corresponding to any physical addresses; and the physical address corresponds to at least one logical address or is prevented from corresponding to any logical addresses.

17. The electronic apparatus of claim 16, wherein the access state information includes a unique/shared indicator, and:

if the physical address corresponds to the logical address only, the unique/shared indicator is set to a unique state; and if the physical address corresponds to a plurality of logical addresses, or it is undetermined whether the physical address corresponds to the logical address only, the unique/shared indicator is set to a shared state.

18. The electronic apparatus of claim 17, wherein:

in response to performing at least one of a snapshot operation and a deduplication operation on the data in the storage device, the unique/shared indicator is set to the shared state.

19. The electronic apparatus of claim 17, wherein caching the data from the storage device into the cache comprises:

in response to a request for a read operation on the data, determining whether the data is cached in the cache; and in response to determining that the data is absent from the cache:

duplicating the data from the storage device into the cache; and setting the unique/shared indicator to the shared state.

20. The electronic apparatus of claim 17, wherein accessing the data cached in the cache comprises:

in response to the access request being a rewrite request, determining whether the unique/shared indicator is in the unique state or the shared state;

in response to determining that the unique/shared indicator is in the unique state, directly performing a rewrite operation on the data in the cache; and in response to determining that the unique/shared indicator is in the shared state, caching data for rewriting in a further position in the cache, and setting a separate indicator indicating whether the data for rewriting is directly rewritable to a positive state.

\* \* \* \* \*